(12) United States Patent
Simanonis et al.

(10) Patent No.: US 7,565,079 B2
(45) Date of Patent: Jul. 21, 2009

(54) SYSTEM AND METHOD FOR OPTICAL NETWORK DEMARCATION

(75) Inventors: Christopher F. Simanonis, Winfield, IL (US); Daniel Wynard, Lockport, IL (US)

(73) Assignee: Westell Technologies, Inc., Aurora, IL (US)

( * ) Notice: Subject to any disclaimer, the term of this patent is extended or adjusted under 35 U.S.C. 154(b) by 527 days.

(21) Appl. No.: 11/516,307

(22) Filed: Sep. 6, 2006

(65) Prior Publication Data

US 2007/0098403 A1    May 3, 2007

Related U.S. Application Data

(60) Provisional application No. 60/732,968, filed on Nov. 3, 2005.

(51) Int. Cl.
*H04B 10/08* (2006.01)
*H04J 14/00* (2006.01)
*H04J 14/02* (2006.01)

(52) U.S. Cl. .............................. 398/33; 398/45; 398/55; 398/82

(58) Field of Classification Search ............... 398/2, 398/5, 9, 10, 13, 17, 20, 25, 33, 38, 45, 48–50, 398/55–57, 82

See application file for complete search history.

(56) References Cited

U.S. PATENT DOCUMENTS 5,978,113 A    11/1999   Kight

| 6,882,644 | B1  |       | 4/2005 | Bendak et al. |
|-----------|-----|-------|--------|---------------|
| 7,394,981 | B2  | *     | 7/2008 | Manifold ...................... 398/17 |
| 2002/0015200 | A1 | * | 2/2002 | Jennings et al. ............. 359/124 |
| 2004/0172657 | A1 | * | 9/2004 | Phillips et al. .............. 725/110 |

FOREIGN PATENT DOCUMENTS

WO    WO 2004/027580 A2    4/2004

* cited by examiner

*Primary Examiner*—Dalzid Singh
(74) *Attorney, Agent, or Firm*—McDonnell, Boehnen, Hulbert and Berghoff LLP (57) ABSTRACT

A system and method are presented for demarcating an optical network. The system comprises an optical monitor that receives a portion of an outbound signal from an optical network and generates a switch control signal based on the intensity of the outbound signal. Generally, the switch control signal is active when the intensity of the outbound signal falls below a threshold value. Alternatively, the system comprises an override switch, and the switch control signal is active when the override signal is activated or the outbound signal falls below a threshold value. An optical switch receives the switch control signal, and selectively isolates the network generating the outbound signal from the rest of the network when the switch control signal is active. The method for demarcating an optical network comprises generally coupling both the inbound signals of first and second networks and the outbound signals of the networks, and selectively isolating the first and second networks by looping signals back into the networks when the outbound signal of the second network falls below a threshold value.

20 Claims, 7 Drawing Sheets

SYSTEM AND METHOD FOR OPTICAL NETWORK DEMARCATION

CROSS-REFERENCE TO RELATED APPLICATIONS

This application claims the benefit of the filing date of U.S. Provisional Application No. 60/732,968, filed Nov. 3, 2005, entitled "Optical Demark Module," the disclosure of which is incorporated in its entirety by reference herein.

BACKGROUND

1. Field

The present invention relates generally to the field of optical sensors and switches. More specifically, the present invention relates to optical sensors and switches for demarcating optical networks and isolating network signal fault conditions.

2. Description of the Related Art

In a typical optical network deployment, there is generally a point at which the service provider hands off its high-speed optical fiber to equipment under the control of another entity, such as another service provider or an end-user. This equipment, which is not under the control of the service provider, is often referred to as customer premise equipment (CPE). Because the CPE is not under the control of, and often times not accessible by, the service provider, the obligation of the service provider to ensure network functionality often exists only up to the point where the service provider network interfaces with the CPE.

Figure 1A:
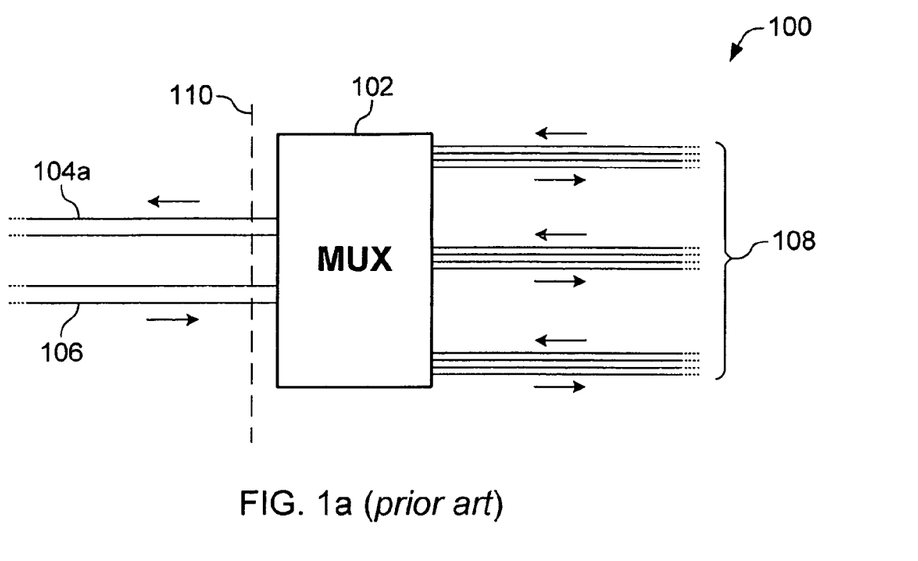
FIG. 1a is a block diagram showing an interface between service provider equipment and customer premise equipment, according to the prior art.
Figure 1B:
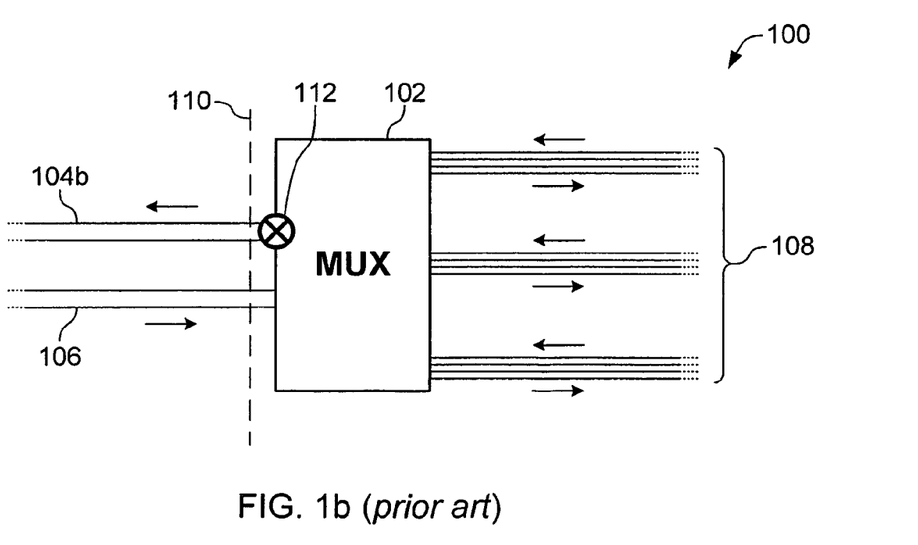
FIG. 1b is a block diagram showing an interface between service provider equipment and customer premise equipment suffering from a loss-of-signal (LOS) equipment failure, according to the prior art.

FIGS. 1a and 1b are block diagrams showing a typical interface 100 between a service provider network and a customer premise network. A network demarcation line 110 generally denotes the boundary between the equipment of the service provider and the CPE. On the left-hand side of the network demarcation line 110 is the service provider equipment, which may include a high-speed optical fiber, such as an OC-X fiber. The CPE is shown on the right side of the network demarcation line 110. Where the CPE is provided for an end-user, the CPE may include a fiber multiplexer 102 that derives multiple DS3 or DS1 signals 108 from an incoming high-speed inbound data signal 106. As noted above, generally and theoretically, the responsibility of the service provider for providing service ends at the network demarcation line 110.

As shown in FIG. 1a, both the high-speed inbound data signal 106 and a valid high-speed outbound data signal 104a directly connect to the CPE multiplexer 102. As a result, a cut output fiber, a disconnected output fiber, or a CPE multiplexer 102 failure may create a loss-of-signal (LOS) that is propagated into the service provider's network. For example, as shown in FIG. 1b, the CPE multiplexer 102 suffers from an equipment failure 112 that results in an LOS condition and an invalid outbound signal 104b. Customers may alert the service provider of the problem or service provider network control equipment may detect the error. However, because there is no intelligence at the network demarcation line 110, the service provider may need to dispatch field technicians to diagnose the entire fiber facility at or near the interface. Once in the field, the technicians may discover that the failure is due to CPE, and is either not responsibility of the service provider or not accessible by the service provider.

In view of the above issues, it would be beneficial to have a system and method for demarcating an optical network, especially one that can generate a loopback condition in each of the networks. Such a system could prevent the propagation of LOS conditions from one network to another, and could promote efficient use of quality control resources, amongst other benefits.

SUMMARY

In general, the invention involves a system and method for demarcating optical networks. In one aspect, the invention involves a system for demarcating optical networks comprising network interfaces for two sets of inbound and outbound signals; an optical monitor for measuring the intensity of one of the outbound signals and generating a loopback signal when the intensity of this outbound signal is below a threshold; and an optical switch that selectively couples the first set of inbound and outbound signals to each other, and the second set of inbound and outbound signals to each other, when the loopback signal is generated. In a variation of this aspect of the invention, the optical monitor may comprise an optical splitter that splits off a portion of the measured outbound signal, an optical level meter that converts the split off portion of the measured outbound signal into a voltage signal, and a comparator that compares this voltage signal to a threshold voltage signal, where the comparator generates the loopback signal when the voltage signal generated by the optical level meter is below the threshold voltage signal.

In another aspect, the invention involves a system for detecting and isolating network failures in an optical network that comprises network interfaces for two sets of inbound and outbound signals; an override switch that outputs an override switch signal; an optical monitor for measuring the intensity of one of the outbound signals and generating a loopback signal based on the intensity of the outbound signal and the override switch signal; and an optical switch that: (i) is in a passive state when either the intensity of the outbound signal is above the threshold and the override switch is disengaged, or the intensity of the outbound signal is below the threshold and the override switch is engaged; and (ii) is in a loopback state when either the intensity of the outbound signal is below the threshold and the override switch is disengaged, or the intensity of the outbound signal is above the threshold and the override switch is engaged. In a variation of this aspect of the invention, the optical monitor may comprise a switch control logic that receives the override switch signal and an outbound signal intensity signal, and outputs a switch control signal. Additionally, the override switch may have a timeout characteristic that automatically disengages the override switch after a set period of time.

In yet another aspect, the invention involves a method for demarcating an optical network that comprises receiving first and second pair of inbound and outbound signals from a first and second network, respectively; coupling the first and second pairs of signals such that the first inbound signal is coupled to the second inbound signal, and the first outbound signal is coupled to the second outbound signal; measuring the intensity of the second outbound signal; comparing the intensity of the second outbound signal to a threshold value; and selectively isolating the first and second networks when the intensity of the second outbound signal falls below a threshold value, by coupling the first inbound signal to the first outbound signal, and the second inbound signal to the second outbound signal.

In these and other embodiments of the invention, the invention acts to detect and isolate errors in a network, and additionally to prevent the propagation of signal losses from one network to another. In addition, implementations of the invention are independent of the type of information being sent over and through optical networks; specifically, implementations are independent of the protocol or data transport method utilized in the network.

These and other aspects and advantages of the invention will become apparent to those of ordinary skill in the art in view of the following detailed description, with reference to the accompanying figures where appropriate. Further, it is understood that this summary is merely an example and is not intended to limit the scope of the invention as claimed.

BRIEF DESCRIPTION OF THE DRAWINGS

Exemplary embodiments of the invention are described below in conjunction with the appended figures, wherein like reference numerals refer to like elements in the various figures, and wherein.

DETAILED DESCRIPTION

A system and method for demarking an optical network is described. Among other benefits, use of the invention to demark an optical network permits a user to locate faults in the network, and to do so remotely if necessary. In addition, using the system or method to demark an optical network helps prevent the widespread failure of optical networks by isolating network failures and limiting the propagation of errors due to a failed sub-network.

Figure 2A:
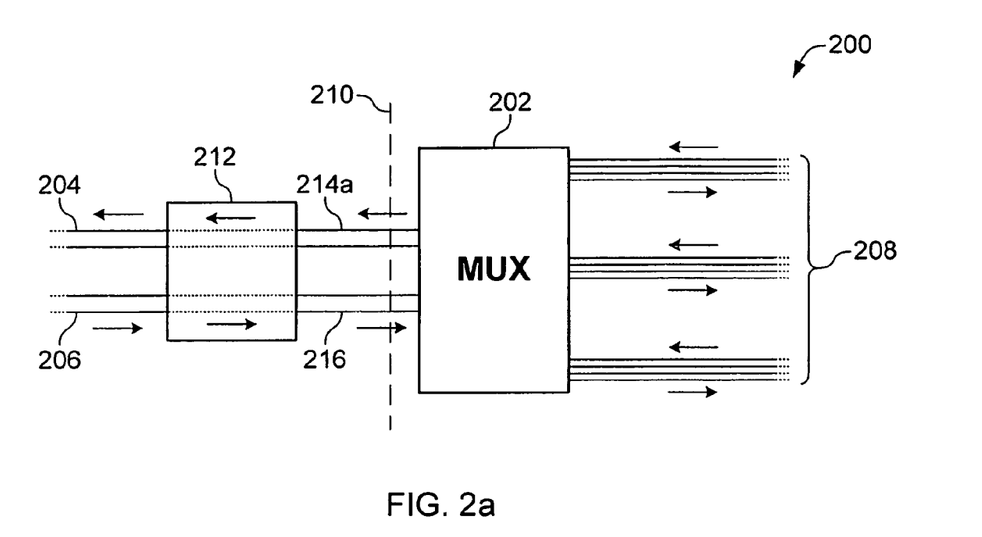
FIG. 2a is a block diagram showing an interface between service provider equipment and customer premise equipment that includes an optical demarcation system, according to an example.
Figure 2B:
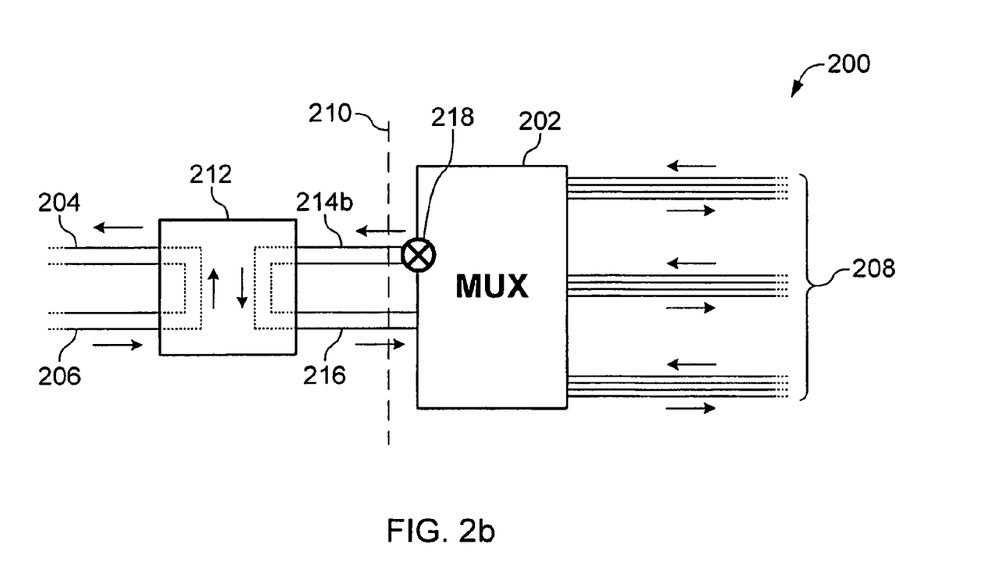
FIG. 2b is a block diagram showing an interface between service provider equipment and customer premise equipment that includes an optical demarcation system, where the customer premise equipment is suffering from an LOS condition, according to an example.
Figure 2C:
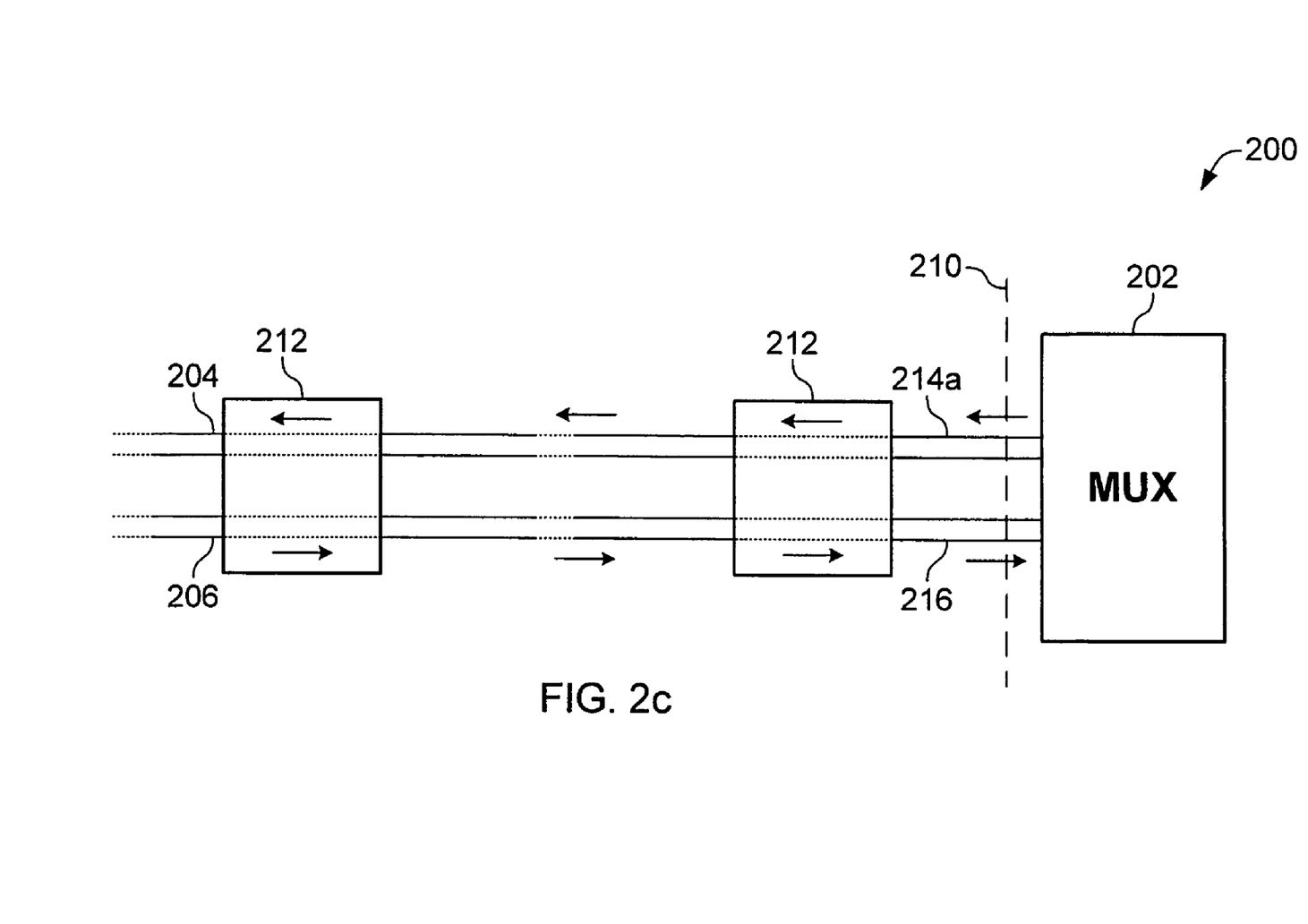
FIG. 2c is a block diagram showing an interface between service provider equipment and customer premise equipment that includes two optical demarcation systems, according to an example.

FIGS. 2a, 2b, and 2c show a general interface 200 between service provider equipment and customer premise equipment (CPE). This interface may occur where the service provider terminates its high-speed optical network fiber (for example, a synchronous optical network (SONET) based optical fiber), at a customer equipment unit. This customer premise equipment may be in the control of the actual end user of the optical network, or it may be owned or controlled by another service provider.

The line 210 indicates a virtual network demarcation line that generally separates the service provider equipment from the CPE. As illustrated in FIGS. 2a, 2b, and 2c, the demarcation line 210 generally denotes a separation of the overall network into a two networks: a service provider network on the left side of demarcation line 210, and a CPE network on the right side of demarcation line 210. The service provider equipment includes a high-speed optical network fiber bundle, such as OCx standard optical fiber, having inbound and outbound components 206 and 204, respectively. The inbound and outbound components 206 and 204 may be united into a single fiber bundle, or may be grouped into separate fiber bundles. On the other side of demarcation line 210, the CPE comprises a fiber multiplexer (MUX) 202 that receives the high-speed optical network fiber of the service provider and drops the one or more lower-speed electrical or optical signals 208. The configuration of FIGS. 2a and 2b is common in such scenarios where, for example, the CPE is representative of an end user system, in which case the MUX 202 may drop multiple DS3 or DS1 signals. For example, the MUX 202 may be a system that receives high-speed optical network fiber and provide 16 DS1 and 2 DS3 connections, such as the Lucent Explorer optical fiber multiplexer.

In order to realize an effective boundary between two networks, such as between the service provider equipment and the CPE, a network demarcation system 212 is introduced into the network at or near the interface between the two networks. In FIGS. 2a and 2b, the network demarcation system 212 bridges two sections of the high-speed optical fiber: the demarcation system 212 receives an inbound signal 206 from the service provider and an outbound signal 214a from the CPE, and outputs an inbound signal 216 to the CPE and an outbound signal 204 to the service provider. As shown in FIG. 2a, the network demarcation system 212 generally operates in a passive manner, and simply couples both the inbound signals 206 and 216, and the outbound signals 214a and 204. Ideally, the coupling provided by the demarcation system 212 is lossless, such that the signal 216 is the same intensity as 206; however, it understood that a certain amount of loss may occur through the demarcation system 212. In addition, the outbound signal 204 may be of lower intensity than the outbound signal 214a, due to sampling of the outbound signal 214a that may occur within the demarcation system 212, as described below.

In the case that a network system error occurs in the CPE network, the outbound high-speed network signal 214a may undergo a reduction or complete loss of optical intensity. In FIG. 2b, the network error, or loss-of-signal (LOS), is represented at 218, and results in an outbound network signal 214b having an optical intensity below a threshold intensity. This network error may be caused by a cut output fiber, a disconnected output fiber, a multiplexer or other network equipment failure, or any other error that causes either a significant drop in signal intensity or a loss of signal. According to an embodiment of the invention, the demarcation system 212 detects the drop in or loss of intensity of the outbound signal 214b and responds by essentially isolating the service provider network from the CPE network.

As illustrated in FIG. 2b, in response to an error in the CPE network, the demarcation system 212 reroutes the inbound and outbound signals such that the inbound signal 206 is coupled to the outbound signal 204, and the inbound signal 216 is coupled to the outbound signal 214b, thereby creating a loopback condition. As a result of this rerouting of the signals, the network signal provided by the service provider is looped back toward the service provider network in order to maintain a live signal and prevent an alarm condition on the service provider network. Any network error detection equipment located in the service provider network will indicate that the intensity of the service provider network is normal, or that there was only a momentary interruption of the signal in the service provider network. This momentary interruption may last during the period which the demarcation system 212 detects the error in the CPE network and acts to reroute the inbound and outbound signals to the loopback configuration illustrated in FIG. 2b. However, despite any momentary interruption, the demarcation system 212 will prevent an LOS error in the CPE network from propagating back into the service provider network. In addition, the loopback condition created by the demarcation system 212 causes the LOS condition of the CPE network to propagate back into the CPE network, generally placing the CPE into an alarm state such that the customer is aware of the network error.

The network demarcation system 212 may additionally or alternatively be introduced into the service provider network as shown in FIG. 2c. While FIG. 2c shows two network demarcation systems 212, it is understood that one demarcation system 212 for detecting network errors in either the CPE or the service provider network may be used as well. By including the network demarcation system 212 in the service provider network, the demarcation system 212 may detect a drop in or loss of intensity of the inbound signal 206. In response to an error in the service provider network, the demarcation system 212 may isolate the CPE network from the service provider network by rerouting the inbound and outbound signals such that the inbound signal 206 is coupled to the outbound signal 204, and the inbound signal 216 is coupled to the outbound signal 214b, thereby creating a loopback condition as described above.

Figure 3A:
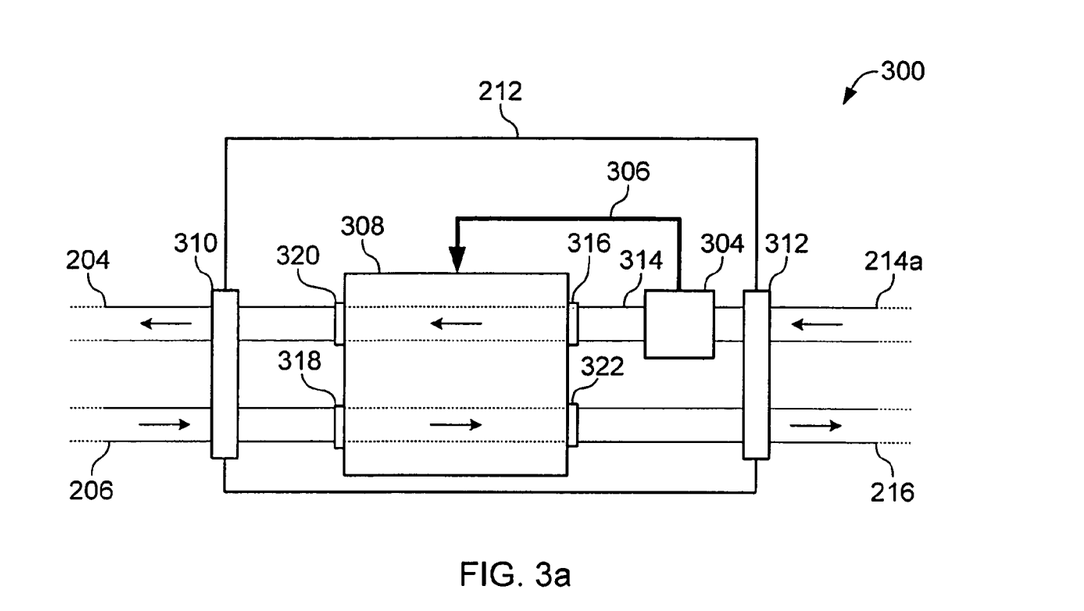
FIG. 3a is a simplified schematic of an optical demarcation system operating in the absence of an LOS condition, according to an example.
Figure 3B:
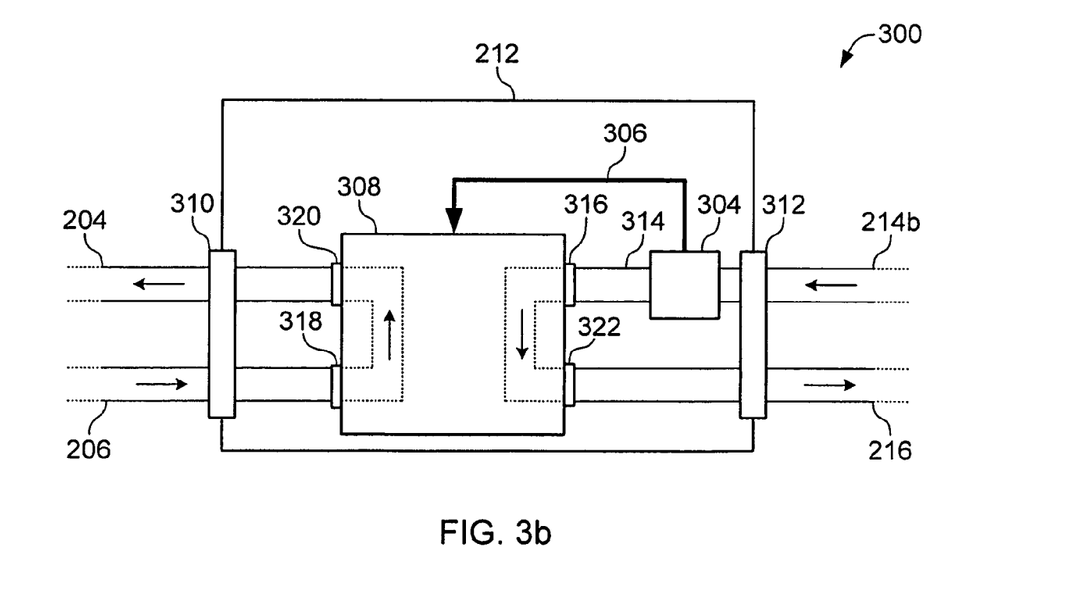
FIG. 3b is a simplified schematic of an optical demarcation system operating in the presence of an LOS condition, according to an example.

FIGS. 3a and 3b provide a general schematic of the network demarcation system 212, according to an example. In general, and for ease of interconnectivity, the demarcation system 212 comprises a first interface 310 for receiving and transmitting the inbound and outbound signals 206 and 204 of a first network, and a second interface 312 for receiving the transmitting the inbound and outbound signals 216, 214a of a second network. These interfaces 310, 312 may be standard fiber connectors or bulkheads, and may be adapted for one or more standard fiber interfaces, such as SC, ST, or FC, for example. The interfaces 310 and 312 permit the transfer of signals 204, 206, 214a, and 216, ideally with little or no loss.

The outbound signal 214a from the second network is received by interface 312 and is passed to an optical monitor 304. The monitor 304 samples a portion of the outbound signal 214a and passes the remaining portion 314 to an optical switch 308. Generally, the portion of the outbound signal that is sampled by the optical monitor 304 is a relatively small portion of the overall signal 214a, and is proportionally small in comparison to the remaining portion 314. For example, the sampled portion may only comprise about 1% to about 10% of the overall intensity of the outbound signal 214a.

After sampling a portion of the signal, the optical monitor 304 determines the intensity of the outbound signal 214a, and generates a switch control signal 306 based on whether the intensity of the outbound signal 214a is below a threshold value. The switch control signal 306 is received by an optical switch 308 and indicates a loopback condition when the outbound signal 214a is below the threshold value; otherwise, where the outbound signal 214a is above the threshold value (or otherwise does not indicate a LOS condition), then the switch control signal 306 indicates a passive state for the optical switch 308, in which the network signals are exchanged between the first and second networks. Specifically, in the passive state the optical switch provides that the inbound signals 206 and 216 are coupled, and the outbound signals 214a and 204 are coupled.

The optical switch 308 of the demarcation system 212 provides optical coupling between two sets of optical signals. The optical switch 308, receives two input optical signals at two input ports 316, 318, and outputs two input signals at two output ports 320, 322. The optical switch 308 is capable of routing the signals received at its input ports 316, 318 to either output port 320 or 322. As noted above, the optical switch 308 responds to the switch control signal 306, such as from the optical monitor 304. In its passive (or pass-through) state, as illustrated in FIG. 3a, the optical switch 308 routes the signal received at input port 316 to output port 320, and routes the signal received at input port 318 to output port 322. In this fashion, the optical switch 308 passes outbound and inbound signals between the two networks (such as a service provider network and a CPE network), specifically by coupling the inbound signals 216 and 206, and coupling the outbound signals 214a and 204.

When an LOS condition is detected in the second network, the switch control signal 306 indicates a loopback state for the optical switch 308, as shown in FIG. 3b. In its loopback state, the optical switch 308 reroutes the input signals 206, 214b so that the signal received at input port 316 is routed to output port 322, and the signal received at input port 318 is routed to output port 320. In this manner, the deficient signal 214b is coupled to inbound signal at 216, thereby preventing the LOS condition from propagating out of the second network. Additionally, the live signal carried by inbound signal 206 is coupled to outbound signal 204, preventing a LOS alarm in the first network. Ideally, the loopback state of the optical switch 308 is a non-latching loopback. In one example, where the optical switch 308 is powered by a power source, if the power source fails or the optical switch 308 otherwise loses power, the optical switch 308 returns to its default, passive state.

Figure 4:
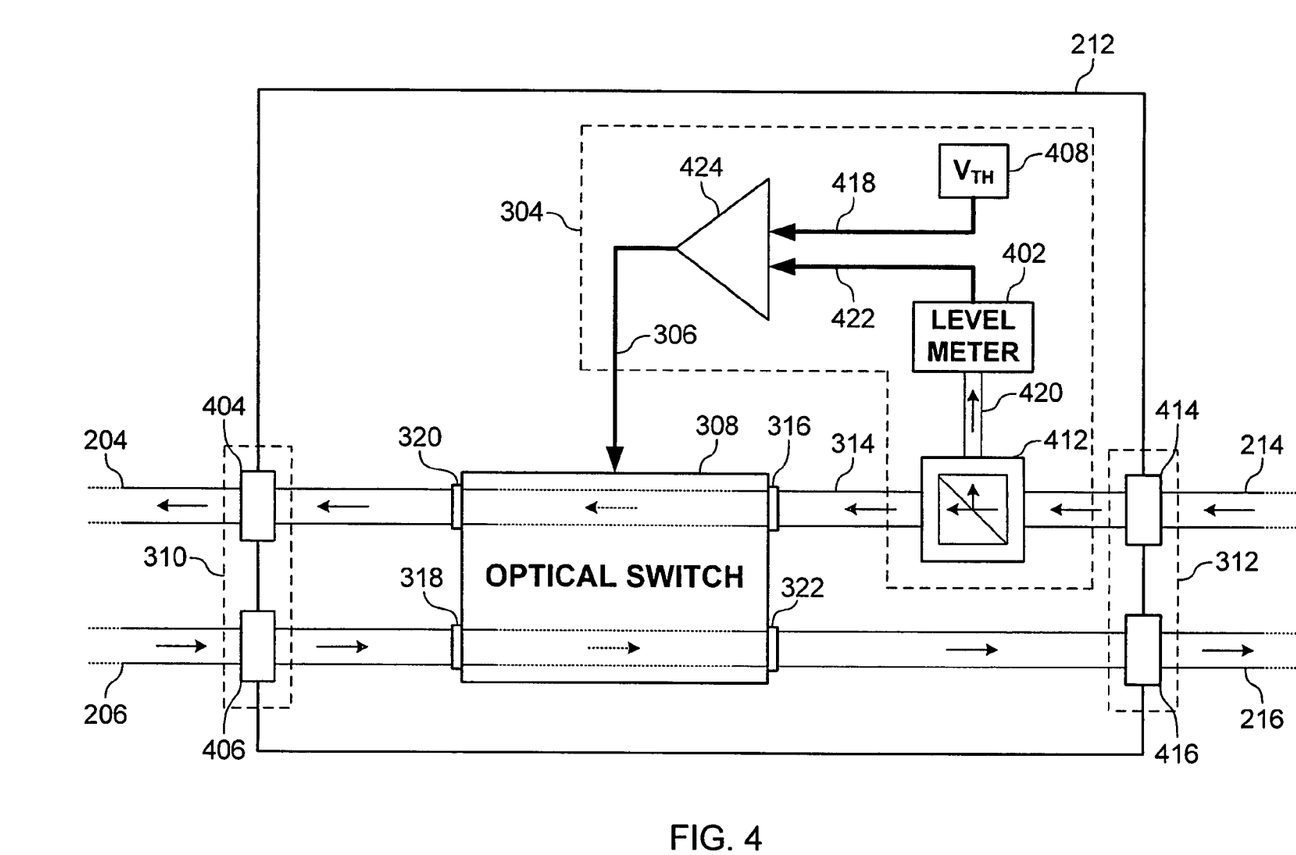
FIG. 4 is a detailed schematic of an optical demarcation system having an optical monitor for measuring the intensity of an outbound signal, according to an example.

FIG. 4 provides a more detailed illustration of the network demarcation system 212, according to an example. In the example shown, the optical monitor 304 comprises an optical splitter 412, an optical level meter 402, and a comparator 424. The optical splitter 412, several varieties of which are known in the art, receives the outbound signal 214 and splits it into a sample portion 420 and a remaining outbound signal portion 314. The sample portion 420 is a very small portion of the overall outbound signal 214, and is proportionally smaller than the remaining outbound signal portion 314. In one example of the invention, about 95% of the outbound signal 214 is transmitted to the optical switch 308, while the remaining 5% of the signal represents the sample portion 420 that is passed to the optical level meter 402. In another example, the optical splitter 412 may be configurable in order to vary the proportion of signal 214 transmitted to the optical switch 308, compared to the portion passed to the optical level meter 402.

The optical level meter 402 receives the sample portion 420 from the optical splitter 412 and converts the optical signal into a corresponding voltage signal 422. In general, the strength of the voltage signal 422 is a function of the intensity of the sample portion 420, and is therefore representative of the intensity of the overall outbound signal 214. In one example, the voltage signal 422 generated by the optical level meter may vary directly and proportionately to the intensity of the sample portion 420, and therefore vary similarly to the intensity of the overall outbound signal 214. The voltage signal representation of the intensity of the outbound signal 412 is output to the comparator 424.

The comparator 424 receives as its input a threshold voltage signal 418 and the voltage signal 422 generated by the optical level meter 402. The threshold voltage signal 418 may be generated by a threshold voltage generator 408, which may generate a fixed or variable voltage. In one example, a user may be able to vary the threshold voltage generated by the threshold voltage generator 408 in order to vary the sensitivity of the demarcation system 212. In this manner, the threshold may be varied in order to suit the demarcation system 212 for a variety of applications. Alternatively, the threshold voltage generator 408 may be pre-configured or hard-wired to generate a standard threshold voltage.

Generally, the threshold voltage of the threshold voltage generator 408 is set at a level comparable to that of a voltage signal representative of an inbound signal intensity that indicates a LOS condition. Such a level may be known for a given system, or may be determined experimentally by determining intensity levels at which error rates become debilitating in a network. In addition, this threshold voltage level may be generally set independent of the protocol or transport method used to send data in the optical network.

The comparator 424 compares the threshold voltage signal 418 to the voltage signal 422 generated by the optical level meter 402. The comparator 424 outputs a signal 306 based on the comparison of these two input signals, and in the example illustrated in FIG. 4, this signal 306 acts as a switch control signal. If voltage signal 422 is above the indicated threshold voltage 418, the comparator 424 generates a switch control signal 306 that maintains optical switch 308 in a passive state. However, if voltage signal 422 is below the indicated threshold voltage 418, the comparator 424 generates a switch control signal 306 that indicates a loopback state for the optical switch 308. The optical switch 308 responds to the switch control signal 306 by appropriately changing between a passive state and a loopback state, as indicated by the switch control signal 306.

Figure 5:
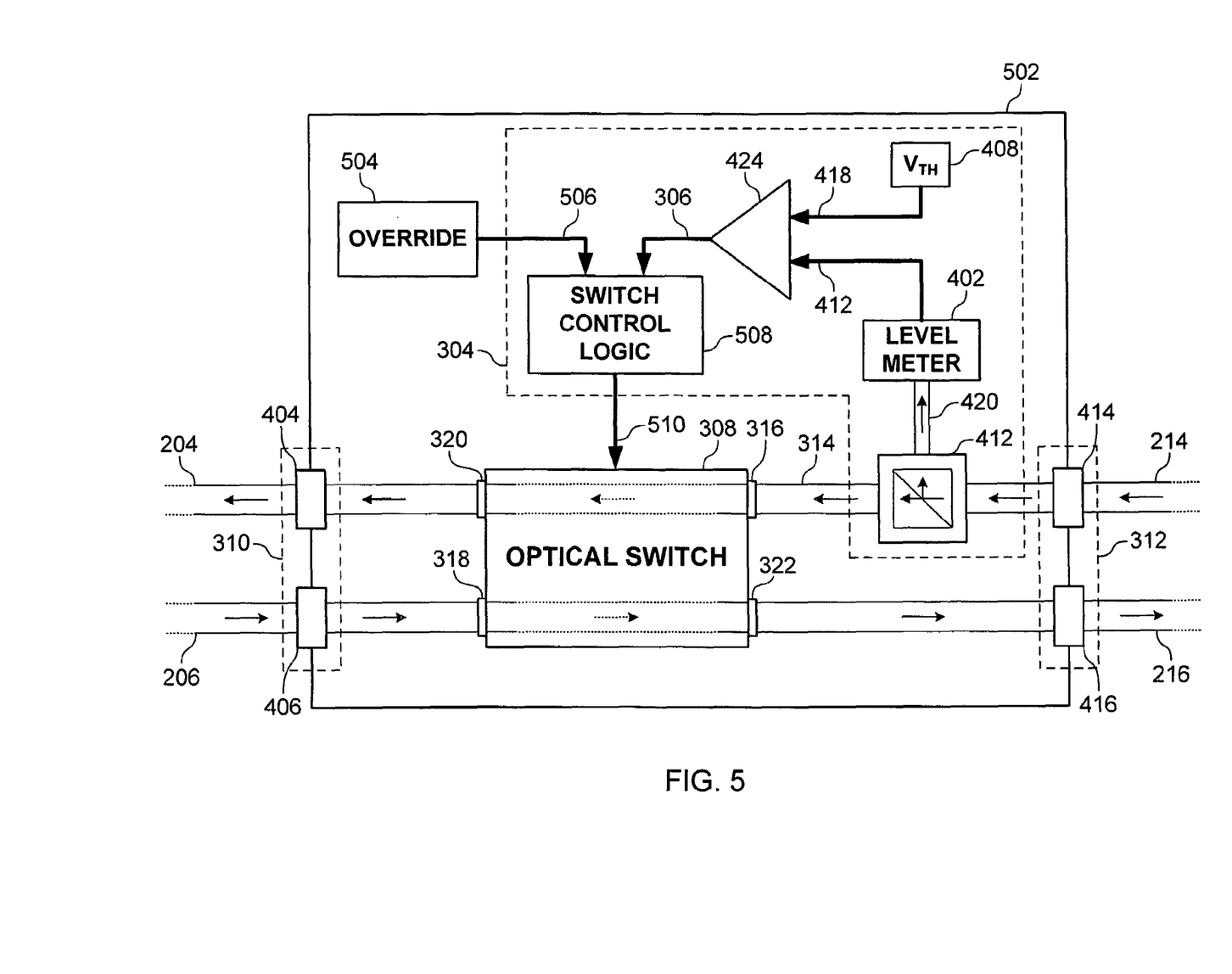
FIG. 5 is a detailed schematic of an optical demarcation system having an override switch, according to an example.

FIG. 5 provides a detailed illustration of another demarcation system 502 comprising an override switch 504 that permits a user to manually override a loopback state, or likewise manually induce a loopback state. In the system 502, the demarcation system 212 includes a manual override switch 504 and switch control logic 508. The override switch 504 may be in an active (engaged) state or an inactive (disengaged) state, and has as its output an override signal 506. The override signal 506 indicates whether the override switch is active, and in general the signal 506 may be active when the override switch 504 is engaged and is inactive when the switch 504 is disengaged. In one example, the override switch 504 may have a timeout function, which automatically disengages the override switch 504 after a set period of time. Including a timeout function may prevent the demarcation system 502 from accidentally being left in an override mode.

The switch control logic 508 receives as its input the override signal 506 and the output signal 306 of comparator 424, which indicates whether the intensity of the outbound signal 214 is above or below the threshold value. The switch control logic 508 then outputs a switch control signal 510 based upon the override signal 506 and the comparator output signal 306. The switch control signal 510 is generated by the switch control logic 508 according to the following conditions. The switch control signal 510 indicates a loopback state if (i) the override switch 504 is inactive and the voltage signal 412 is below the threshold voltage signal 418, or (ii) the override switch 504 is active and the voltage signal 412 is above the threshold voltage signal 418. In addition, the switch control signal 510 indicates a passive state for the optical switch 308 if (i) the override switch 504 is inactive and the voltage signal 412 is above the threshold voltage signal 418, or (ii) the override switch is active and the voltage signal 412 is below the threshold voltage signal 418. In one example, where the outputs signals of the comparator 424 and the override switch 504 are digital signals, and the switch control signal 510 is also digital, the switch control logic 508 may comprise an XOR logic gate.

Figure 6:
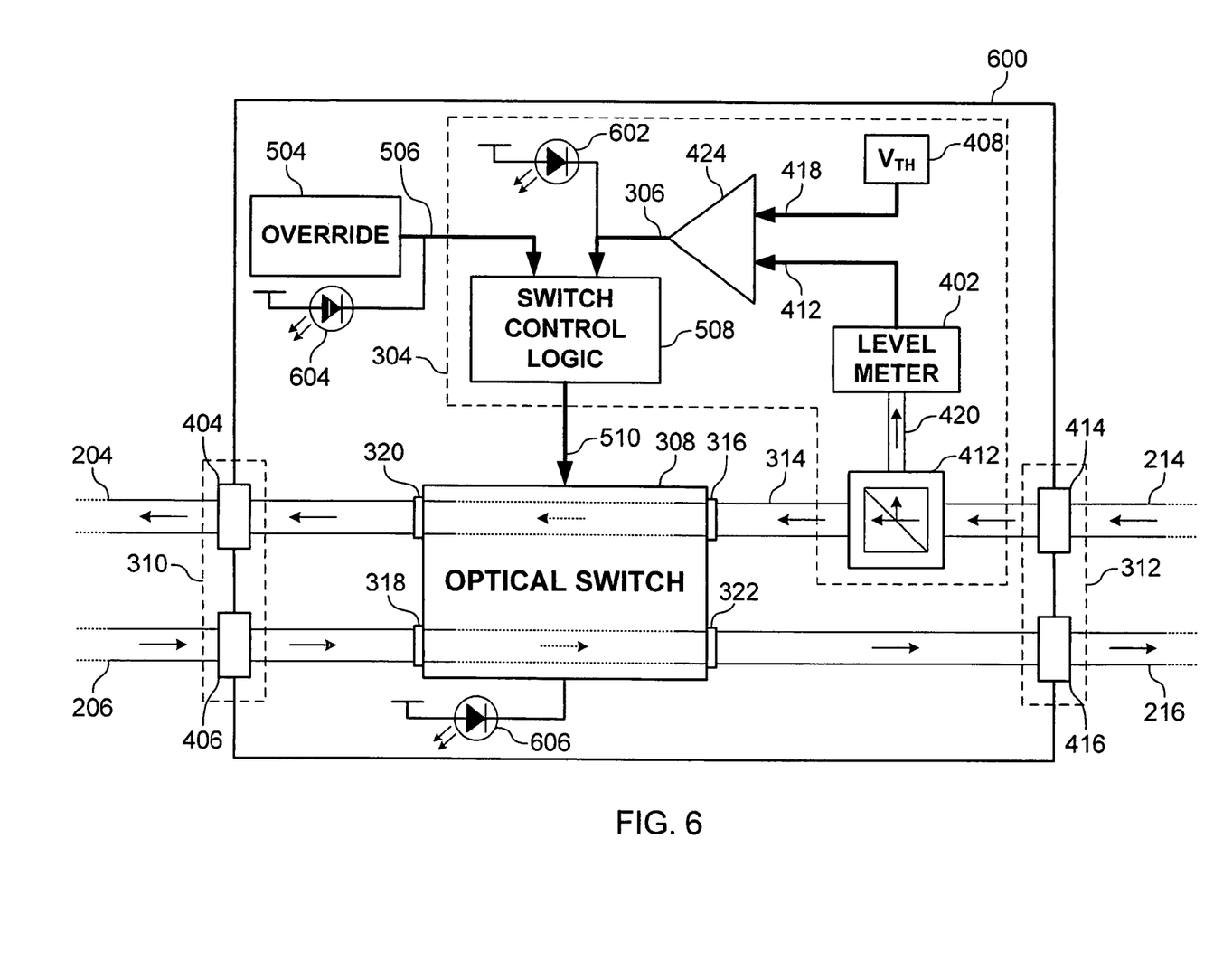
FIG. 6 is a detailed schematic of an optical demarcation system having visual indicators to signify the current operating state of the optical demarcation system, and the state of certain internal signals, according to an example.

FIG. 6 provides a detailed illustration of another example of a demarcation system 600, comprising visual indicators of the state of the system, and the states of the various signals in the system. The system 600 may comprise an LOS indicator 602 that visually indicates the output of the comparator 424, and whether the intensity of the outbound signal 214 is above or below the threshold value as indicated by the threshold voltage 408. In one example, the LOS indicator 602 may be lit when the intensity of the outbound signal 214 (as represented by the voltage signal 412 output of the optical level meter 402) is below the threshold voltage signal 418. Additionally, although the indicator 602 is represented as an LED, any other visual indicator may be used instead.

In addition, the system may comprise an override indicator 604 that visually indicates the state of the override signal 506. In one example, the override indicator 604 may be lit when the override signal 506 is active, and unlit when the signal is inactive. Likewise, although the indicator 604 is represented as an LED, any other visual indicator may be used instead.

Also, the system 600 may comprise a loopback state indicator 606 that visually indicates the state of the optical switch 308, specifically whether the optical switch 308 is in a passive or loopback state. In one example, the loopback state indicator 606 may be lit when the optical switch 308 is in a loopback state and unlit when it is in a passive state. Likewise, although the indicator 606 is represented as an LED, any other visual indicator may be used instead.

Additionally, as the various electrical components (such as the optical switch 308, the optical level meter 402, the threshold voltage source 408, the switch control logic 508, and any visual indicators) of the demarcation system 212 in its various examples may be powered by a power source, the demarcation system 212 may include a power indicator that indicates the state of the power source. For example, the demarcation system 212 may have a power source that includes a DC-DC converter fed by a voltage and ground source, and which provides a constant DC output voltage. In one example, the DC-DC converter may be fed by a −48 V DC source and a ground source. The power indicator may receive the constant DC output voltage of the DC-DC converter as its power source, and may be lit when the DC-DC converter is active.

It should be understood that the illustrated embodiments are examples only and should not be construed as limiting the scope of the present invention. Although the above examples are presented with respect to service provider and customer premise networks, aspects of the invention may be utilized to demarcate any two optical networks. In addition, embodiments of the invention are not limited to high-speed optical networks, and may be used in end-user networks in order to prevent the propagation of network error or LOS problems throughout a network. Also, the drawings are illustrative and meant to support the detailed description; as such the present invention is not limited to the embodiments presented in the drawings. Moreover, the drawings are not to scale, and connections between various components are not limited to those shown in the drawings, as other components and connections may exist. Finally, the various components may differ in their actual order and configuration without deviating from the full scope and scale of the invention. Therefore, all embodiments that come within the scope and spirit of the following claims and equivalents thereto are claimed as the invention.

We claim:

1. A system for demarcating optical networks comprising:
a first network interface for receiving a first inbound signal and outputting a first outbound signal;
a second network interface for outputting a second inbound signal and receiving a second outbound signal;
an optical monitor that receives a portion of the second outbound signal, and outputs a switch control signal, wherein the switch control signal represents an intensity of the second outbound signal, and wherein the switch control signal is active when the second outbound signal is below a threshold value; and
an optical switch that receives the switch control signal and wherein:
the optical switch couples the first inbound signal to the second inbound signal, and couples the first outbound signal to the second outbound signal when the switch control signal is inactive; and
the optical switch couples the first inbound signal to the first outbound signal, and the second inbound signal to the second outbound signal when the switch control signal is active.

2. The system of claim 1 wherein the optical monitor comprises:
an optical level meter that receives the portion of the second outbound signal and outputs an intensity voltage signal; and
a comparator that receives a threshold voltage signal corresponding to the threshold value, compares the threshold voltage signal to the intensity voltage signal, and outputs the switch control signal.

3. The system of claim 1 further comprising an optical splitter that receives the second outbound signal, outputs the portion of the second outbound signal to the optical monitor, and outputs a remaining portion of the second outbound signal to the optical switch.

4. The system of claim 3 wherein the portion of the second outbound signal represents about five percent of the second outbound signal.

5. The system of claim 1 wherein the optical monitor comprises:
an optical splitter that receives the second outbound signal and outputs the portion of the second outbound signal to the optical monitor;
an optical level meter that receives the portion of the second outbound signal and outputs an intensity voltage signal; and
a comparator that receives a threshold voltage signal corresponding to the threshold value, compares the threshold voltage signal to the intensity voltage signal, and outputs the switch control signal.

6. The system of claim 1 further comprising a loss-of-signal light emitting diode (LED) that indicates if the customer equipment signal intensity is below the threshold value.

7. The system of claim 1 further comprising a power supply.

8. The system of claim 1 wherein the first network interface and the second network interface are one of the following standard fiber interfaces: SC, ST, or FC.

9. A system for demarcating optical networks comprising:
a first network interface for receiving an first inbound signal and outputting an first outbound signal;
a second network interface for outputting an second inbound signal and receiving an second outbound signal;
an override switch that outputs an override switch signal, wherein the override switch signal is active when the override switch is activated;
an optical monitor that measures the intensity of the second outbound signal, receives the override switch signal, and outputs a switch control signal, wherein the switch control signal is active when the second outbound signal intensity is below a threshold value and the override switch is inactive, or when the outbound signal is above the threshold value and the override switch is active; and
an optical switch that receives the switch control signal wherein the optical switch couples the first inbound signal to the second inbound signal, and couples the first outbound signal to the second outbound signal when the switch control signal is inactive, and wherein the optical switch couples the first inbound signal to the first outbound signal, and the second outbound signal to the second inbound signal when the switch control signal is active.

10. The system of claim 9 wherein the optical monitor comprises:
an optical splitter that receives the second outbound signal and outputs a portion of the second outbound signal;
an optical level meter that receives the portion of the second outbound signal and outputs an intensity voltage signal;
a comparator that receives a threshold voltage signal corresponding to the threshold value, compares the threshold voltage signal to the intensity voltage signal, and outputs a level detection control signal; and
a switch control logic that receives the override switch signal and the level detection control signal, and outputs the switch control signal.

11. The system of claim 9 further comprising:
an override LED that indicates if the override switch is activate;
a loss-of-signal LED that indicates if the second outbound signal intensity is below a threshold value; and
a loopback LED that indicates if the switch control signal is active.

12. The system of claim 9 wherein the optical switch is non-latching.

13. The system of claim 9 wherein the override switch has a timeout that inactivates the override switch after a set period of time.

14. A method for demarcating an optical network comprising:
receiving a first inbound signal and outputting a first outbound signal;
receiving a second outbound signal and outputting a second inbound signal;
measuring the intensity of the second outbound signal;
comparing the intensity of the second outbound signal to a threshold value;
generating a switch control signal, representative of the relationship between and intensity of the second outbound signal and the threshold value;
coupling the first inbound signal to the second inbound signal and the second outbound signal to the first outbound signal; and
selectively coupling the first inbound signal to the first outbound signal and the second inbound signal to the second outbound signal when the switch control signal is active.

15. The method of claim 14 wherein the switch control signal is active when the intensity of the second outbound signal is below the threshold value.

16. The method of claim 14 further comprising indicating a network loss-of-service if the second outbound signal falls below the threshold value.

17. The method of claim 14 wherein generating the switch control involves determining whether an override signal is active.

18. The method of claim 17 wherein the switch control signal indicates the selective coupling of the first inbound signal to the first outbound signal and the second inbound signal to the second outbound signal when:

the intensity of the second outbound signal is below the threshold value and the override signal is inactive;

the intensity of the second outbound signal is above the threshold value and the override signal is active.

19. The method claim 18 further comprising:

indicating a second network loss-of-service if the second outbound signal falls below the threshold value;

indicating a system override if the override signal is active; and indicating a loopback state if there is selective coupling of both the first inbound signal to the first outbound signal and the second inbound signal to the second outbound signal.

20. The method of claim 14 wherein the selective coupling of the first inbound signal to the first outbound signal and the second inbound signal to the second outbound signal ceases if there is a loss of power.

\* \* \* \* \*